United States Patent
Wang et al.

(10) Patent No.: US 6,766,320 B1
(45) Date of Patent: Jul. 20, 2004

(54) SEARCH ENGINE WITH NATURAL LANGUAGE-BASED ROBUST PARSING FOR USER QUERY AND RELEVANCE FEEDBACK LEARNING

(75) Inventors: Hai-Feng Wang, Hong Kong (CN);
Kai-Fu Lee, Woodinville, WA (US);
Qiang Yang, Burnaby (CA)

(73) Assignee: Microsoft Corporation, Redmond, WA (US)

(*) Notice: Subject to any disclaimer, the term of this patent is extended or adjusted under 35 U.S.C. 154(b) by 303 days.

(21) Appl. No.: 09/645,806

(22) Filed: Aug. 24, 2000

(51) Int. Cl.[7] .............................................. G06F 17/30
(52) U.S. Cl. ................................. 707/5; 707/3; 704/9
(58) Field of Search ........................ 707/3–6, 9; 704/9

(56) References Cited

U.S. PATENT DOCUMENTS

| | | | | | |
|---|---|---|---|---|---|
| 5,454,106 | A | * | 9/1995 | Burns et al. ..................... | 707/4 |
| 5,625,252 | A | | 4/1997 | Tsuzurahara et al. ........ | 313/414 |
| 5,673,369 | A | * | 9/1997 | Kim .............................. | 706/59 |
| 5,842,221 | A | * | 11/1998 | Schmonsees ............. | 707/104.1 |
| 5,864,844 | A | * | 1/1999 | James et al. .................... | 707/4 |
| 5,920,854 | A | * | 7/1999 | Kirsch et al. .................... | 707/3 |
| 5,926,784 | A | * | 7/1999 | Richardson et al. ........... | 704/9 |
| 5,933,822 | A | * | 8/1999 | Braden-Harder et al. ....... | 707/5 |
| 5,974,412 | A | * | 10/1999 | Hazlehurst et al. ............ | 707/3 |
| 5,995,921 | A | * | 11/1999 | Richards et al. ................ | 704/9 |
| 6,028,601 | A | * | 2/2000 | Machiraju et al. .......... | 345/705 |
| 6,029,195 | A | * | 2/2000 | Herz ........................... | 725/116 |
| 6,076,088 | A | * | 6/2000 | Paik et al. ....................... | 707/5 |
| 6,182,083 | B1 | * | 1/2001 | Scheifler et al. ......... | 707/103 R |
| 6,240,420 | B1 | * | 5/2001 | Lee ............................. | 707/102 |
| 6,256,623 | B1 | * | 7/2001 | Jones ............................ | 707/3 |
| 6,256,648 | B1 | * | 7/2001 | Hill et al. ................. | 707/501.1 |
| 6,346,952 | B1 | * | 2/2002 | Shtivelman ................. | 345/758 |
| 6,370,526 | B1 | * | 4/2002 | Agrawal et al. ............... | 707/5 |
| 6,405,161 | B1 | * | 6/2002 | Goldsmith .................... | 704/9 |
| 6,434,550 | B1 | * | 8/2002 | Warner et al. ................. | 707/3 |
| 6,453,315 | B1 | * | 9/2002 | Weissman et al. ............. | 707/5 |
| 6,493,699 | B2 | * | 12/2002 | Colby et al. ................... | 707/2 |
| 6,560,590 | B1 | * | 5/2003 | Shwe et al. ................... | 706/55 |
| 6,675,159 | B1 | * | 1/2004 | Lin et al. ....................... | 707/3 |
| 2003/0208472 | A1 | * | 11/2003 | Pham ............................ | 707/2 |

OTHER PUBLICATIONS

Yi–Ming Chung, William M. Pottenger, Bruce R. Schatz. "Automatic Subject Indexing Using an Associative Neural Network". Digital Libraries 98. ACM. Mar. 98. pp. 59–.*

* cited by examiner

*Primary Examiner*—Jean R. Homere
(74) *Attorney, Agent, or Firm*—Lee & Hayes, PLLC

(57) ABSTRACT

A search engine architecture is designed to handle a full range of user queries, from complex sentence-based queries to simple keyword searches. The search engine architecture includes a natural language parser that parses a user query and extracts syntactic and semantic information. The parser is robust in the sense that it not only returns fully-parsed results (e.g., a parse tree), but is also capable of returning partially-parsed fragments in those cases where more accurate or descriptive information in the user query is unavailable. A question matcher is employed to match the fully-parsed output and the partially-parsed fragments to a set of frequently asked questions (FAQs) stored in a database. The question matcher then correlates the questions with a group of possible answers arranged in standard templates that represent possible solutions to the user query. The search engine architecture also has a keyword searcher to locate other possible answers by searching on any keywords returned from the parser. The answers returned from the question matcher and the keyword searcher are presented to the user for confirmation as to which answer best represents the user's intentions when entering the initial search query. The search engine architecture logs the queries, the answers returned to the user, and the user's confirmation feedback in a log database. The search engine has a log analyzer to evaluate the log database to glean information that improves performance of the search engine over time by training the parser and the question matcher.

34 Claims, 7 Drawing Sheets

SEARCH ENGINE WITH NATURAL LANGUAGE-BASED ROBUST PARSING FOR USER QUERY AND RELEVANCE FEEDBACK LEARNING

TECHNICAL FIELD

This invention relates to search engines and other information retrieval tools.

BACKGROUND

With the explosive growth of information on the World Wide Web, there is an acute need for search engine technology to keep pace with users' need for searching speed and precision. Today's popular search engines, such as "Yahoo!" and "MSN.com", are used by millions of users each day to find information. Unfortunately, the basic search method has remained essentially the same as the first search engine introduced years ago.

Search engines have undergone two main evolutions. The first evolution produced keyword-based search engines. The majority of search engines on the Web today (e.g., Yahoo! and MSN.com) rely mainly on keyword searching. These engines accept a keyword-based query from a user and search in one or more index databases. For instance, a user interested in Chinese restaurants in Seattle may type in "Seattle, Chinese, Restaurants" or a short phrase "Chinese restaurants in Seattle".

Keyword-based search engines interpret the user query by focusing only on identifiable keywords (e.g., "restaurant", "Chinese", and "Seattle"). Because of its simplicity, the keyword-based search engines can produce unsatisfactory search results, often returning many irrelevant documents (e.g., documents on the Seattle area or restaurants in general). In some cases, the engines return millions of documents in response to a simple keyword query, which often makes it impossible for a user to find the needed information.

This poor performance is primarily attributable to the ineffectiveness of simple keywords being capable of capturing and understanding complex search semantics a user wishes to express in the query. Keyword-based search engines simply interpret the user query without ascribing any intelligence to the form and expression entered by the user.

In response to this problem of keyword-based engines, a second generation of search engines evolved to go beyond simple keywords. The second-generation search engines attempt to characterize the user's query in terms of pre-defined frequently asked questions (FAQs), which are manually indexed from user logs along with corresponding answers. One key characteristic of FAQ searches is that they take advantage of the fact that commonly asked questions are much fewer than total number of questions, and thus can be manually entered. By using user logs, they can compute which questions are most commonly asked. With these search engines, one level of indirection is added by asking the user to confirm one or more rephrased questions in order to find an answer. A prime example of a FAQ-based search engine is the engine employed at the Web site "Askjeeves.com".

Continuing our example to locate a Chinese restaurant in Seattle, suppose a user at the "Askjeeves.com" site enters the following search query:

"What Chinese restaurants are in Seattle?"

In response to this query, the search engine at the site rephrases the question as one or more FAQs, as follows:

How can I find a restaurant in Seattle?

How can I find a yellow pages listing for restaurants in Seattle, Wash.?

Where can I find tourist information for Seattle?

Where can I find geographical resources from Britannica.com on Seattle?

Where can I find the official Web site for the city of Seattle?

How can I book a hotel in Seattle?

If any of these rephrased questions accurately reflect the user's intention, the user is asked to confirm the rephrased question to continue the searching process. Results from the confirmed question are then presented.

An advantage of this style of interaction and cataloging is much higher precision. Whereas the keyword-based search engines might return thousands of results, the FAQ-based search engine often yields a few very precise results as answers. It is plausible that this style of FAQ-based search engines will enjoy remarkable success in limited domain applications, such as web-based technical support.

However, the FAQ-based search engines are also limited in their understanding the user's query, because they only look up frequently occurring words in the query, and do not perform any deeper syntactic or semantic analysis. In the above example, the search engine still experiences difficulty locating "Chinese restaurants", as exemplified by the omission of the modifier "Chinese" in any of the rephrased questions. While FAQ-based second-generation search engines have improved search precision, there remains a need for further improvement in search engines.

Another problem with existing search engines is that most people are dissatisfied with the user interface (UI). The chief complaint is that the UI is not designed to allow people to express their intention. Users often browse the Internet with the desire to obtain useful information. For the keywords-based search engine, there are mainly two problems that hinder the discovery of user intention. First, it is not so easy for users to express their intention by simple keywords. Second, keyword-based search engines often return too many results unrelated to the users' intention. For example, a user may want to get travel information about Beijing. Entering 'travel' as a keyword query in Yahoo, for example, a user is given 289 categories and 17925 sites and the travel information about Beijing is nowhere in the first 100 items.

Existing FAQ-based search engines offer UIs that allow entry of pseudo natural language queries to search for information. However, the underlying engine does not try to understand the semantics of the query or users' intention. Indeed, the user's intention and the actual query are sometimes different.

Accordingly, there is a further need to improve the user interface of search engines to better capture the user's intention as a way to provide higher quality search results.

SUMMARY

A search engine architecture is designed to handle a full range of user queries, from complex sentence-based queries to simple keyword searches. The search engine architecture includes a natural language parser that parses a user query and extracts syntactic and semantic information. The parser is robust in the sense that it not only returns fully-parsed results (e.g., a parse tree), but is also capable of returning partially-parsed fragments in those cases where more accurate or descriptive information in the user query is unavailable. This is particularly beneficial in comparison to previous efforts that utilized full parsers (i.e., not robust parsers) in information retrieval. Whereas full parsers tended to fail on many reasonable sentences that were not strictly grammatical, the search engine architecture described herein always returns the best fully-parsed or partially-parsed interpretation possible.

The search engine architecture has a question matcher to match the fully-parsed output and the partially-parsed fragments to a set of frequently asked questions (FAQs) stored in a database. The question matcher correlates the questions with a group of possible answers arranged in standard templates that represent possible solutions to the user query.

The search engine architecture also has a keyword searcher to locate other possible answers by searching on any keywords returned from the parser. The search engine may be configured to search content in databases or on the Web to return possible answers.

The search engine architecture includes a user interface to facilitate entry of a natural language query and to present the answers returned from the question matcher and the keyword searcher. The user is asked to confirm which answer best represents his/her intentions when entering the initial search query.

The search engine architecture logs the queries, the answers returned to the user, and the user's confirmation feedback in a log database. The search engine has a log analyzer to evaluate the log database and glean information that improves performance of the search engine over time. For instance, the search engine uses the log data to train the parser and the question matcher. As part of this training, the log analyzer is able to derive various weighting factors indicating how relevant a question is to a parsed concept returned from the parser, or how relevant a particular answer is to a particular question. These weighting factors help the search engine obtain results that are more likely to be what the user intended based on the user's query.

In this manner, depending upon the intelligence provided in the query, the search engine's ability to identify relevant answers can be statistically measured in terms of a confidence rating. Generally, the confidence ratings of an accurate and precise search improve with the ability to parse the user query. Search results based on a fully-parsed output typically garner the highest confidence rating because the search engine uses essentially most of the information in the user query to discern the user's search intention. Search results based on a partially-parsed fragment typically receive a comparatively moderate confidence rating, while search results based on keyword searching are given the lowest confidence rating.

DETAILED DESCRIPTION

This disclosure describes a search engine architecture that handles a full range of user queries, from complex sentence-based queries to simple keyword searches. Unlike traditional search engines, the architecture includes a natural language parser that parses a user query and extracts syntactic and semantic information. The parser is robust in the sense that it not only returns fully-parsed results, but is also capable of returning partially-parsed fragments in those cases where more accurate or descriptive information in the user query is unavailable.

When facing ambiguity, the search engine architecture interacts with the user for confirmation in terms of the concept the user is asking. The query logs are recorded and processed repeatedly, thus providing a powerful language model for the natural language parser as well as for indexing the frequently asked questions and providing relevance-feedback learning capability.

The search engine architecture is described in the context of an Internet-based system in which a client submits user queries to a server and the server hosts the search engine to conduct the search on behalf of the client. Moreover, the search engine architecture is described as handling English and Chinese languages. However, the architecture may be implemented in other environments and extended to other languages. For instance, the architecture may be implemented on a proprietary local area network and configured to handle one or more other languages (e.g., Japanese, French, German, etc.).

Exemplars Computing Environment

Figure 1:
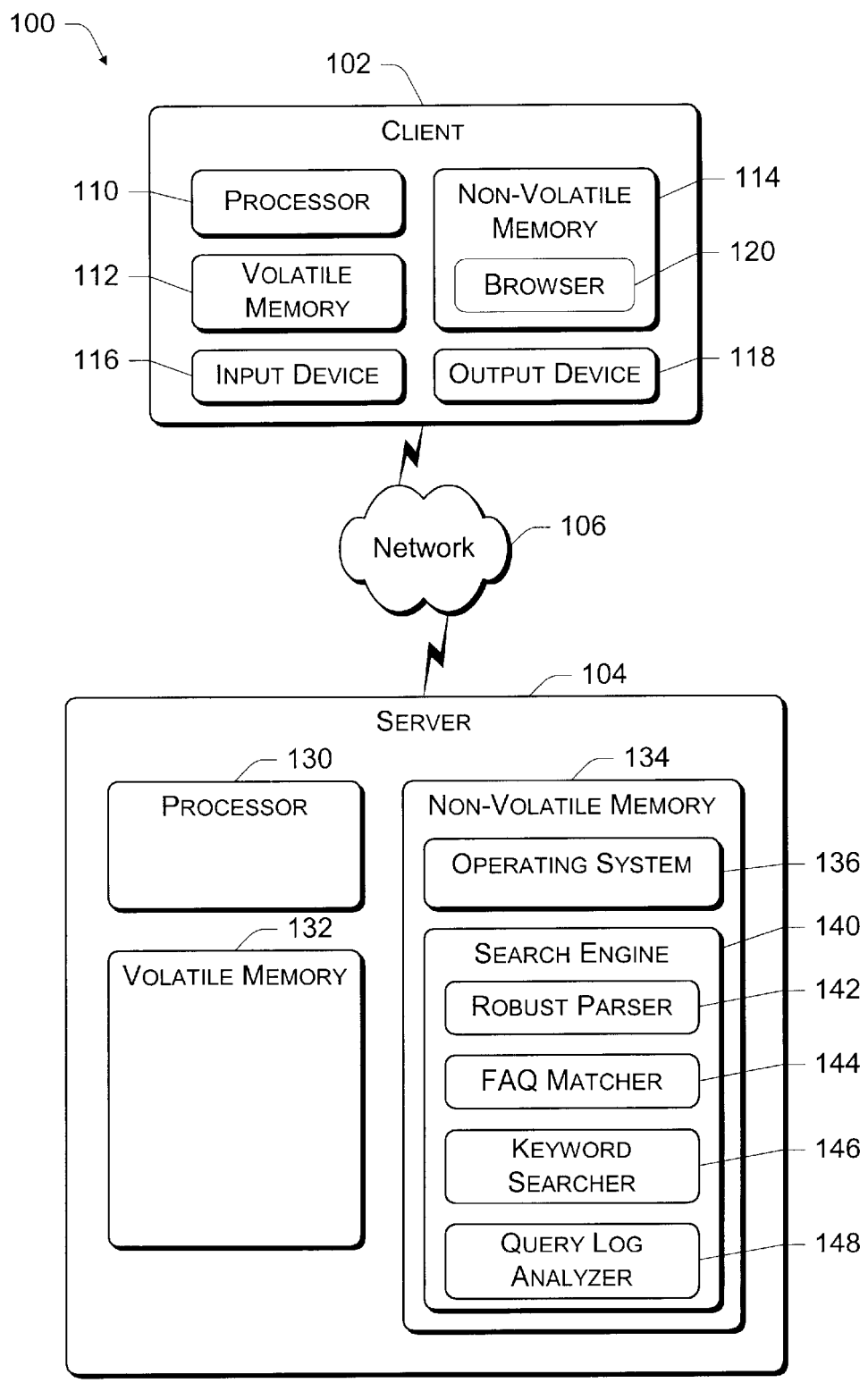
FIG. 1 is a block diagram of an exemplary computer network in which a server computer implements a search engine for handling client queries.

FIG. 1 shows an exemplary computer network system 100 in which the search engine architecture may be implemented. The network system 100 includes a client computer 102 that submits user queries to a server computer 104 via a network 106, such as the Internet. While the search engine architecture can be implemented using other networks (e.g., a wide area network or local area network) and should not be limited to the Internet, the architecture will be described in the context of the Internet as one suitable implementation.

The client 102 is representative of many diverse computer, systems, including general-purpose computers (e.g., desktop computer, laptop computer, etc.), network appliances (e.g., set-top box (STB), game console, etc.), and wireless communication devices (e.g., cellular phones, personal digital assistants (PDAs), pagers, or other devices capable of receiving and/or sending wireless data communication). The client 102 includes a processor 110, a volatile memory 112 (e.g., RAM), a non-volatile memory 114 (e.g., ROM, Flash, hard disk, optical, etc.), one or more input devices 116 (e.g., keyboard, keypad, mouse, remote control, stylus, microphone, etc.) and one or more output devices 118 (e.g., display, audio speakers, etc.).

The client 102 is equipped with a browser 120, which is stored in non-volatile memory 114 and executed on processor 110. The browser 120 facilitates communication with the server 104 via the network 106. For discussion purposes, the browser 120 may be configured as a conventional Internet browser that is capable of receiving and rendering documents written in a markup language, such as HTML (hypertext markup language).

In the illustrated implementation, the server 104 implements a search engine architecture that is capable of receiving user queries from the client 102, parsing the queries to obtain complete phrases, partial phrases, or keywords, and returning the appropriate results. The server 104 is representative of many different server environments, including a server for a local area network or wide area network, a backend for such a server, or a Web server. In this latter environment of a Web server, the server 104 may be implemented as one or more computers that are configured with server software to host a site on the Internet 106, such as a Web site for searching.

The server 104 has a processor 130, volatile memory 132 (e.g., RAM), and non-volatile memory 134 (e.g., ROM, Flash, hard disk, optical, RAID memory, etc.). The server 104 runs an operating system 136 and a search engine 140. For purposes of illustration, operating system 136 and search engine 142 are illustrated as discrete blocks stored in the non-volatile memory 134, although it is recognized that such programs and components reside at various times in different storage components of the server 104 and are executed by the processor 130. Generally, these software components are stored in non-volatile memory 134 and from there, are loaded at least partially into the volatile main memory 132 for execution on the processor 130.

The search engine 140 includes a robust parser 142 to parse a query using natural language parsing. Depending on the search query, the robust parser produces a fully-parsed output (e.g., a parse tree), one or more partially-parsed fragments, and/or one or more keywords. A FAQ matcher 144 matches the fully-parsed output (e.g., a parse tree) and the partially-parsed fragments to a set of possible frequently asked questions that are stored in a database. The FAQ matcher then correlates the questions with a group of possible answers to the user query. A keyword searcher 146 attempts to locate other possible answers from conducting keyword searching using the keywords returned from the parser.

Unlike traditional engines, the search engine architecture robustly accommodates many types of user queries, from single keyword strings to full, grammatically correct sentences. If the user enters a complete sentence, the search engine 140 has the ability to parse the sentence for syntactic and semantic information. This information better reveals the user's intention and allows for a more precise search with higher quality results. If the user enters a grammatically incorrect sentence or an incomplete sentence (i.e., a phrase), the search engine 140 attempts to map the partial fragments to FAQ concepts. Finally, even if the user query contains only one or a few search terms, the search engine is able to handle the query as a keyword-based search and return at least some results, albeit not with the same precision and quality.

The search engine 140 presents the possible answers returned from the FAQ matcher 144 and the keyword searcher 146 to a user. The user is asked to confirm which of the answers best represents the user's intentions in the query. Through this feedback, the search engine may refine the search. Additionally, the search engine may use this relevance feedback to train the architecture in its mapping of a parsed query into relevant answers.

The search engine includes a query log analyzer 148 that tracks the query, the returned results, and the user's feedback to those results in a log database. The query log analyzer 148 analyzes the log database to train the FAQ matcher 144. As part of this training, the query log analyzer 148 is able to derive, over time, various weights indicating how relevant a FAQ is to a parsed concept generated by parsing a particular query, or how relevant a particular answer is to a particular FAQ. These weights help the search engine obtain results that are more likely to be what the user intended based on the user's query.

In this manner, depending upon the intelligence provided in the query, the search engine's ability to identify relevant answers can be statistically measured in terms of a confidence rating. Generally, the confidence ratings of an accurate and precise search improve with the ability to parse the user query. Search results based on a fully-parsed output typically garner the highest confidence rating because the search engine uses essentially most of the information in the user query to discern the user's search intention. Search results based on a partially-parsed fragment typically receive a comparatively moderate confidence rating, while search results based on keyword searching are given the lowest confidence rating.

Search Engine Architecture

The search engine architecture 140 is formulated according to an underlying premise, referred to as the concept-space hypothesis, that a small subset of concepts cover most user queries. Examples of concepts are: "Finding computer and internet related products and services", "Finding movies and toys on the Internet", and so on. It is believed that the first few popular categories will actually cover most of the queries. Upon analyzing a one-day log from MSN.com, the inventors discovered that 30% of the concepts covered approximately 80% of all queries in the selected query pool.

Figure 2:
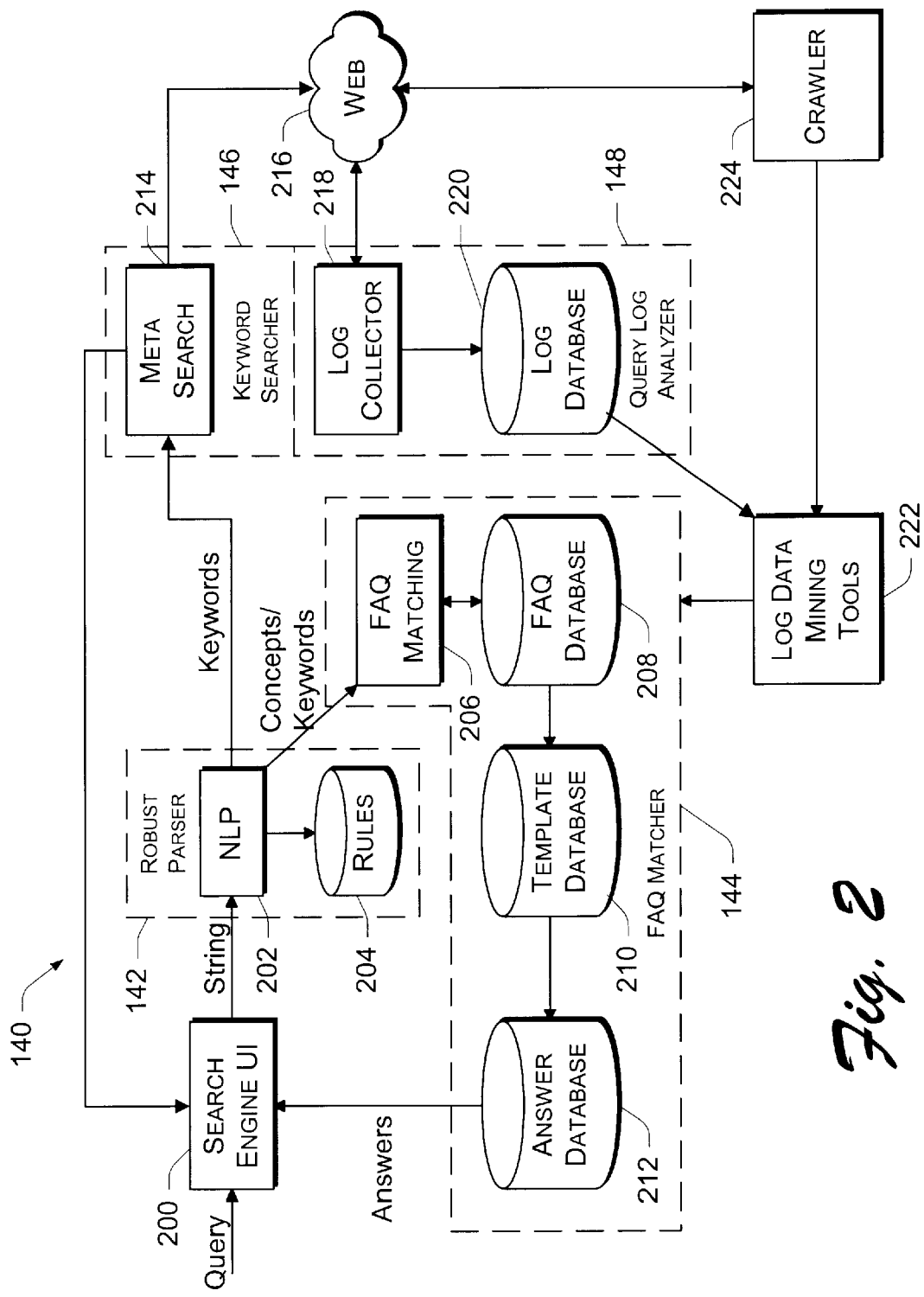
FIG. 2 is a block diagram of a search engine architecture.

FIG. 2 illustrates the search engine architecture 140 in more detail. It has a search engine user interface (UI) 200 that seamlessly integrates search functionality and browsing. In the FIG. 1 network system, the search engine UI 200 is served in an HTML document to the client 102 when the client initially addresses the Web site. One exemplary implementation of the user interface 200 is described below in more detail beneath the heading "Search Engine User Interface".

The user enters a search query via the search engine UI 200. A query string is passed to the natural language-based robust parser 142, which performs robust parsing and extracts syntactic as well as semantic information for natural language queries. The robust parser 142 includes a natural language parser (NLP) 202 that parses the query string according to rules kept in a rules database 204. The parsed output is ranked with a confidence rating to indicate how likely the output represents the query intensions.

The output of the natural language robust parser 142 is a collection of concepts and keywords. The concepts are obtained through a semantic analysis and include a fully-parsed output (e.g., a parse tree) and partially-parsed fragments. One suitable semantic analysis is described below in the section under the heading "NL-based Robust Parsing". The keywords are either the key phrases extracted directly from the user query or are expanded queries through a synonym table.

After natural language processing, the concepts and keywords are passed on to the FAQ matcher 144. The FAQ matcher 144 has a FAQ matching component 206 that attempts to match the concepts and keywords to predefined frequently asked questions stored in a FAQ database 208. From the FAQs, the FAQ matching component 206 identifies related templates from a template database 210 that group together similar question parameters. The templates have associated indexed answers that are maintained in an answer database 212.

Accordingly, the FAQ matcher 144 effectively maps the parsed concepts and keywords to FAQs, the FAQs to templates, and the templates to answers. In one implementation, the FAQ database 208 is configured as a relational database that maintains a set of tables to correlate the concepts, FAQs, templates, and answers. One example database structure is described below with reference to FIG. 7.

Concurrent with FAQ-based searching, the NLP module 142 also sends the keywords to a keyword-based module 146 for keyword searching on the user's query. The keyword-based module 146 has a meta-search engine 214 that extracts answers from the Web 216.

The answers returned from the FAQ matcher 144 and keyword searcher 146 are presented to the user via UI 200. The user is asked to confirm which, if any, of the returned answers best exemplifies the user's intentions in the query. By analyzing which results the user selects, the search engine may further refine the search using the confirmed answer as a starting point and return even more accurate results.

In addition to facilitating various search levels in an integrated manner, the search engine architecture 140 also supports a query log analyzer 148 that implements methodology to process query logs for the purpose of obtaining new question templates with indexed answers. It also has relevance-feedback capability for improving its indexing and ranking functions. This capability allows the architecture 140 to record users' actions in browsing and selecting the search result, so that the ranking of these results and the importance of each selection can be learned over time.

The architecture has a log collector 218 to log user actions and system output in a log database 220. Log data mining tools 222 may be used to analyze the log database 220 to glean data used to refine the FAQ database 208, template database 210, answer database 212, and FAQ matching functions 206. A web crawler 224 may also be included to provide information as needed from the Web 216.

In one implementation, the search engine architecture 140 may be configured according to COM (Component Object Model) or DCOM (Distributed COM). This allows for design modularity, allowing each individual module to evolve independently from others as long as the intermodule interface remains the same.

Compared to the traditional search engines, the search engine architecture 140 offers many benefits, including a higher precision and search efficiency on frequently asked questions. Additionally, the indexed contents evolve with users' current interests and its ranking ability improves with usage over time. The search engine architecture scales easily to offer relatively large coverage for user's questions and the natural user interface allow users to seamlessly integrate search and browsing.

Search Process

Figure 3:
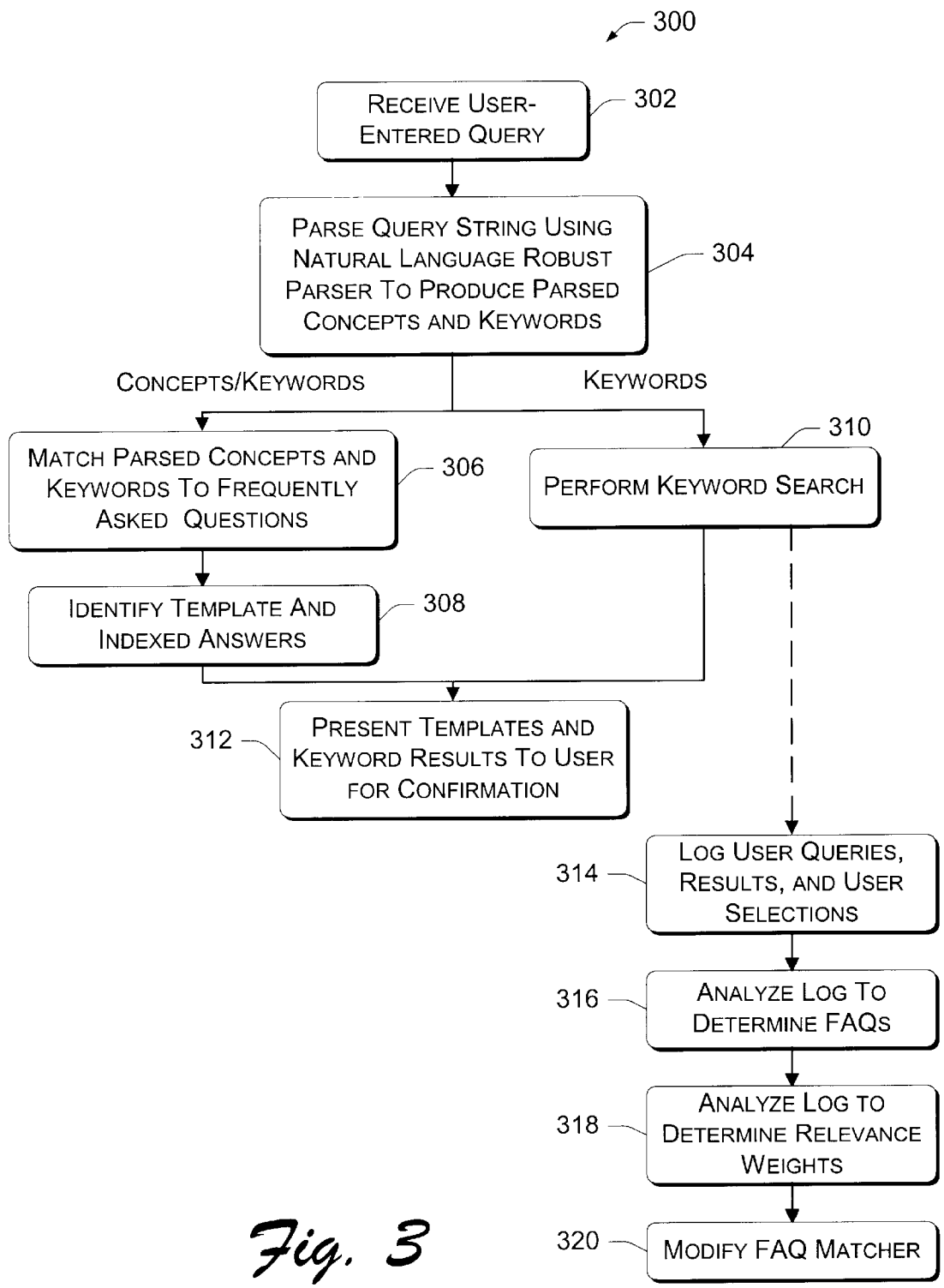
FIG. 3 is a flow diagram of a search process using the search engine.

FIG. 3 shows a search process 300 conducted on the search engine architecture 140 of FIG. 2. The search process 300 is implemented as computer executable instructions that, when executed, perform the operations illustrated as blocks in FIG. 3. Selected operations of the search process 300 are described after this section in more detail.

At block 302, the search engine 140 receives a user query entered at remote client 102. At block 304, the user query is parsed at the natural language robust parser 142 to produce the parsed concepts (if any) and keywords. After parsing, the concepts and keywords are submitted to the FAQ matcher 144 to match them with frequently asked questions in the FAQ database (block 306). Upon identifying matched FAQs, the FAQ matcher 144 identifies associated templates with indexed answers from databases 210 and 212 to obtain answers for the user queries (block 308).

Concurrent to the FAQ-matching operations, the search engine also performs a keyword search at keyword-based module 146 (block 310). At block 312, the results of the FAQ matching and keyword searching are presented to the user via the search engine UI 200. The user is then given the opportunity to offer feedback in an attempt to confirm the accuracy of the search.

Meanwhile, apart from the search functions, the search engine is also providing relevance feedback learning through analysis of the query, the returned results and the user feedback to the search results. At block 314, the log collector 218 logs user queries, results returned to the user, and selections made by the user. These records are stored in the log database 220.

At block 316, the log database 220 is analyzed to ascertain frequently asked questions from a large number of user questions and to automatically develop or find answers for the questions. The log is further analyzed to determine weights indicating how probable the returned results pertain to the users' queries (block 318). In particular, the log analyzer determines how likely the FAQs represent the user queries and how likely the answers pertain to the FAQs. The weightings are used to modify the FAQ matcher 144 (block 320).

NL-Based Robust Parsing (Block 304)

The natural language-based robust parser 142 employs robust parsing to accommodate many diverse types of user queries, including full and partial sentences, meaningful phrases, and independent search terms. User queries are often entered into search engines as incomplete or grammatically incorrect sentences. For instance, users who want to know about Chinese restaurants in Seattle might enter queries quite differently, as illustrated by the following examples:

Chinese restaurants in Seattle

Seattle's best Chinese restaurants

Any Chinese restaurants in Seattle?

Where is the closest Chinese restaurant?

What is the best Chinese restaurant in Seattle?

While it is difficult to parse such sentences using a traditional natural language parser, the robust parser 142 is capable of handling such partial or grammatically incorrect sentences. Unlike traditional parsing that require a hypothesis and a partial parse to cover adjacent words in the input, robust parsing relaxes this requirement, making it possible to omit noisy words in the input. If a user query contains words that are not parsable, the natural language parsing module 142 can skip these words or phrases and still output a result.

Additionally, different hypotheses can result from partial parses by skipping some symbols in parse rules. Thus, if a given sentence is incomplete such that natural language parsing is unable to find a suitable rule to match it exactly, the robust parser provides multiple interpretations of the parsing result and associates with each output a confidence level. In the search engine 140, this confidence level is built based on statistical training.

Figure 4:
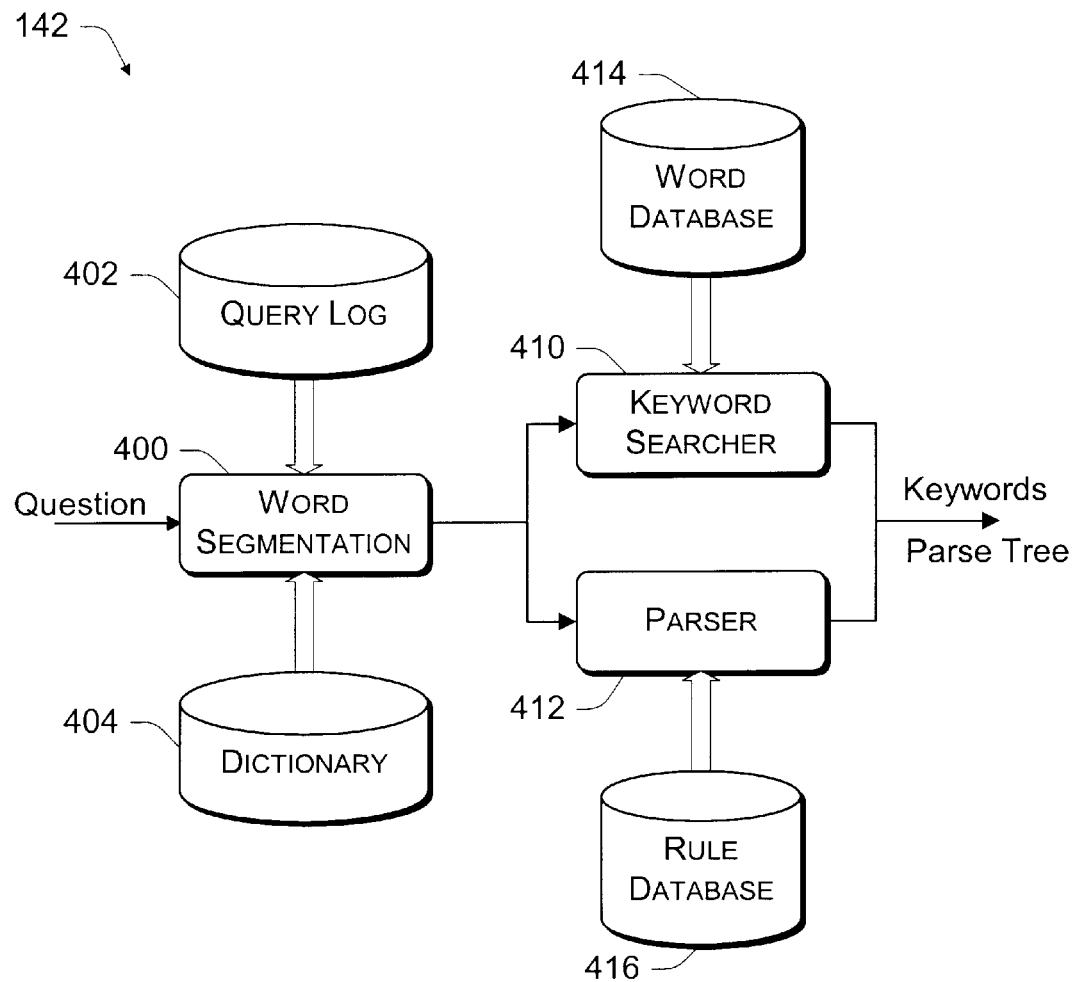
FIG. 4 is a block diagram of a robust parser employed in the search engine.

FIG. 4 shows an exemplary implementation of the natural language robust parser 142. The module includes a word segmentation unit 400, which identifies individual words in a sentence. The word segmentation unit 400 relies on data from a query log 402 and a dictionary 404. In English, words are separated by spaces and hence, word segmentation is easily accomplished. However, in other languages, segmentation is not a trivial task. With Chinese text, for example, there is no separator between words. A sequence of characters may have many possible parses in the word-tokenization stage. Thus, effective information retrieval of Chinese first requires good word segmentation.

Figure 5:
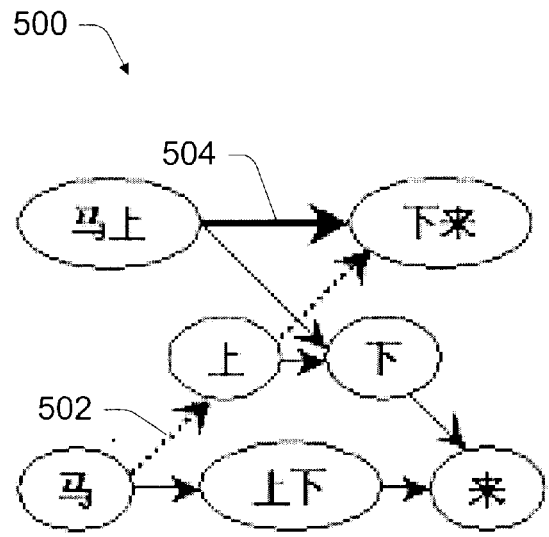
FIG. 5 is a diagrammatic illustration of a tokenization of a Chinese sentence to demonstrate the added difficulties of parsing languages other than English.

FIG. 5 shows an example tokenization 500 of a simple Chinese sentence "马上下来", having only four characters. Here, these four characters can be parsed in five ways into words. For example, the dotted path 502 represents a parsing to the phrase "dismounted a horse", and the bold path 504 represents "immediately coming down". This figure also shows seven possible "words", some of which (e.g., 上下.) might be disputable on whether they should be considered "words."

To accommodate Chinese input, the robust parser can accept two kinds of input: Lattice and N-best. The lattice input includes almost all possible segmentations. However, as there may be too much ambiguity, the parsing process can become very slow. An alternative choice is to use the N-best input.

With reference again to FIG. 4, after segmentation, the segmented sentence is passed a natural language parser 412 and a keyword module 410. The parser 412 attempts to parse the segmented sentence according to a set of rules found in a rule database 416. If a sentence parses successfully, the parsing module 412 outputs a parse tree. If parsing is unsuccessful, the keyword unit 410 uses a word database 414 to extract and output keywords from the segmented sentence. As shown in FIG. 2, the parse tree and keywords are passed to the FAQ matcher 144 and the keywords are passed to the keyword-based component 146. Accordingly, the architecture 140 allows templates to be matched regardless of the type of output, whether parse trees or keywords.

Exemplary Parsing Methodology

One particular implementation of a robust parser is based on a spoken language system known as "LEAP", which stands for Language Enabled Applications. LEAP is technology being developed in Microsoft Research that aims at spoken language understanding. For a more detailed discussion of LEAP, the reader is directed to an article by Y. Wang, entitled "A robust parser for spoken language understanding", *Proc. of 6th European conference on speech communication and technology* (*Eurospeech*99), Budapest, Hungary, September 1999, pp. Vol.5, 2055–2058.

The robust parser employs a parsing algorithm that is an extension of a bottom-up chart-parsing algorithm. The grammar defines semantic classes. Each semantic class is defined by a set of rules and productions. For example, a semantic class <Route> is defined for the travel path from one place to another. This class is represented as follows:

```
<Route> TravelPath {
    =>      @from       <PlaceName:place1>      @to
<PlaceName:place2> @route;
    @from => from | ...;
    ......
}
<PlaceName> Place {
    Beijing | Shanghai | ...;
}
```

In the semantic classes above, <Route> defines a return class type, and TravelPath is a semantic class that contains a number of rules (the first line) and productions (the second line). In this class, "@from" parses a piece of the input sentence according to a production as shown in the second line. The input item after the "@from" object matches according to a <PlaceName> semantic class. If there are input tokens that are not parsable by any parts of the rule, it will be ignored by the parser. In this case, the scoring of the parse result will be correspondingly discounted to reflect a lower level of confidence in the parse result.

As an example, suppose the input query is:

从北京到上海应该怎么走 ?(How to go from Beijing to Shanghai?)

The robust parser will return the following result:

<VOID> 从 place 到 place怎么走
<Route> 从 place 到 place怎么走
<PlaceName:place1> place
<PlaceName:place2> place Here <VOID> represents the root semantic class. Note that this input query cannot be parsed using the first rule in the semantic class TravelPath if a traditional parser is used because the Chinese word "应该" cannot match any objects in the rule. Since the robust parser can skip this word to match the rest, parsing will continue to produce a partial result. In one implementation, the score of the parsing result is calculated by discounting the number of input items and rule items that are skipped during the parsing operation. This score is normalized to give a percentage confidence value.

Evaluating Parsing Results

A parsed result will be selected if it covers the most words in the query and the most parts of rules. To improve the scoring strategy, the search engine learns probabilities from query logs, including:

probabilities of the rules;
penalty for robust rule matching (insertion, deletion, substitution);
probabilities of "non-matching" words;
term probability according to their frequency in query log.

Considering the rule in the semantic class <Route> TravelPath:

@from <PlaceName:place1> @to <PlaceName:place2> @route;

The search engine can train the probabilities associated with this rule. A rule with a high probability value means that using the rule to parse a query is more reliable. The search engine can also train the penalty values for robust matching by exacting a penalty for any item in either a rule or the query sentence that is skipped during parsing.

Consider the above rule for the sentence "从北京到上海应该怎么走" ("How to get from Beijing to Shanghai?"). A relatively low penalty is set if the @from item "应该(should)" is skipped. A higher penalty is assigned if the @route item "怎么走(how to go)" is skipped.

Statistics are gathered using the query log files as the base data. A more detailed discussion of training the robust parser using query log files is described below beneath the heading "Training Robust Parser Using Query Log Files".

Question Matching (Blocks 306 and 308)

The FAQ matcher 144 attempts to find a set of relevant concepts and their related answers from a given user query. To accomplish this, the FAQ matcher 144 maps the concepts through several intermediate spaces to ultimately identify answers to the queries.

Figure 6:
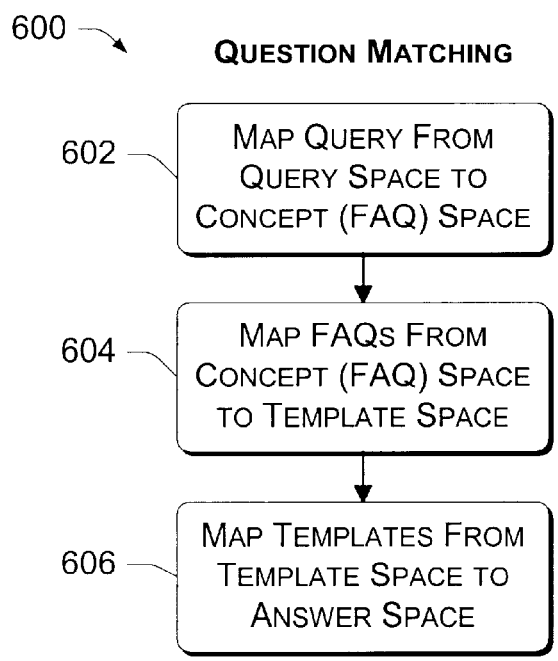
FIG. 6 is a flow diagram of a question matching process employed in the search engine.

FIG. 6 shows a mapping process 600 of the question matching operation. The mapping process 600 is implemented as computer executable instructions that, when executed, perform the operations illustrated as blocks in FIG. 6. For discussion purposes, the mapping process is described in the context of a realistic example in which a user asks:

从北京到上海应该怎么走 ? ("How to go from Beijing to Shanghai?")

At block 602, the FAQ matcher maps the parsed query from a query space to a concept or FAQ space. The natural language processing module 142 returns a parse tree containing a semantic class and its parameters:

<VOID> 从 place 到 place怎么走

<Route> 从 place 到 place怎么走

<PlaceName:place1> place

<PlaceName:place2> place

A collection of concepts indexed on "交通" ("Route") and "旅游" ("Travel"), and possibly other related concepts, are stored in the FAQ database 208.

Figure 7:
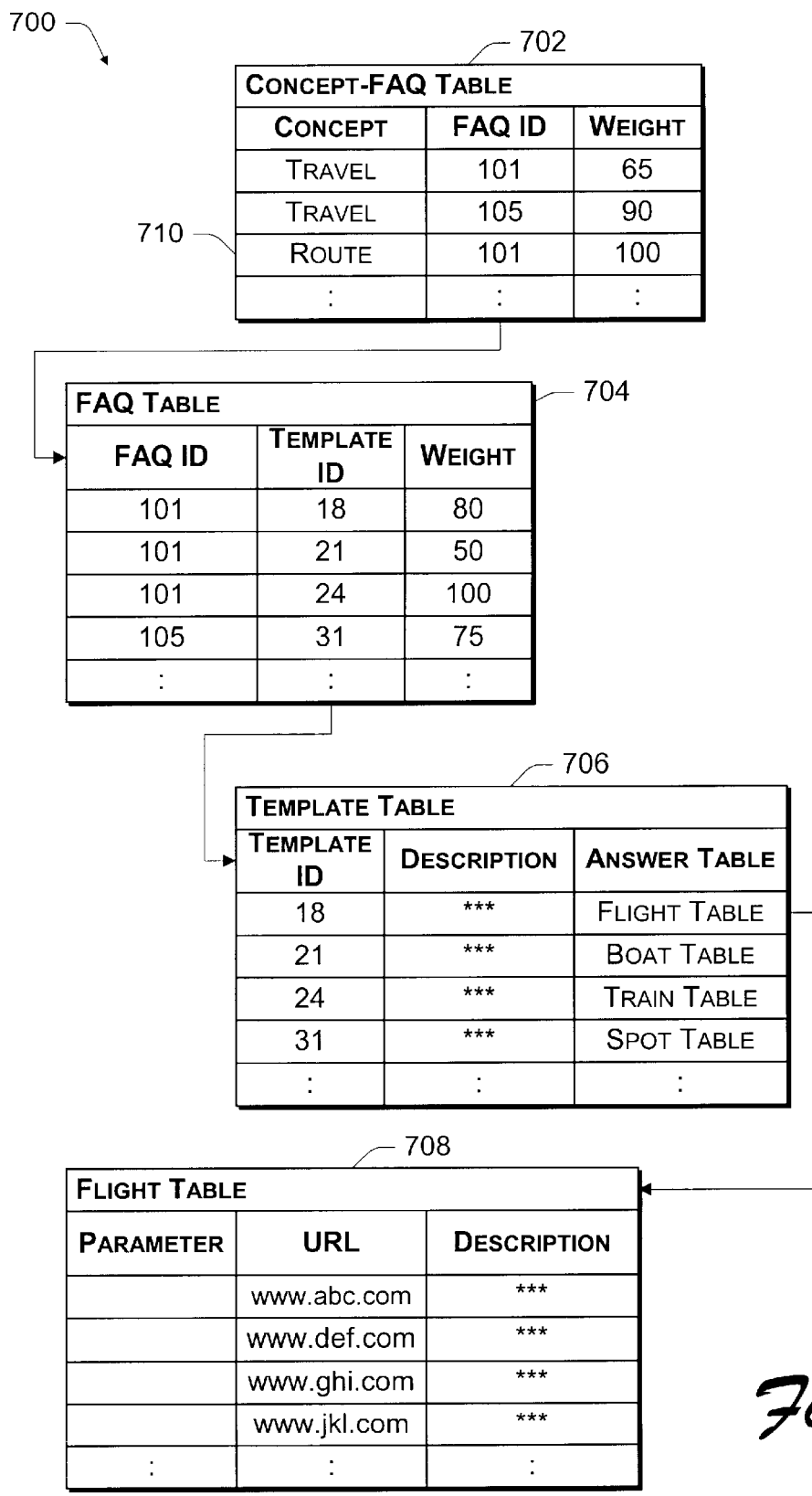
FIG. 7 illustrates database tables used during the question matching process of FIG. 6.

FIG. 7 illustrates example database tables 700 maintained in the FAQ database 208. In this example, the FAQ database is configured as a relational database in which data records are organized in tables that may be associated with one another using definable relationships. The database includes a Concept-FAQ table 702, a FAQ table 704, a template table 706, and an answer table 708. For this example, the answer table 708 pertains to answers about a flight schedule, and hence is labeled as a "Flight Table".

The Concept-FAQ table 702 is the core data structure for the whole database. It correlates concepts with frequently asked questions (FAQs). A FAQ is made up of a few concepts that are in fact represented by certain terms, such as "Route". Every FAQ is related to one or more concepts and every concept is related to one or more FAQs. Thus, there is a many-to-many relationship between FAQs and concepts. Every FAQ is assigned a FAQ ID to uniquely distinguish FAQs from one another.

A record in the Concept-FAQ table 702 includes a concept, a FAQ ID, and a weight. Each record indicates that a FAQ (with a particular ID) is related to the concept according to a correlation weighting factor. The weighting factor indicates how probable the concept pertains to the associated FAQ. The weighting factor is learned from a later analysis of the query log file.

Using the Concept-FAQ table 702, the FAQ matcher 144 computes a correlation between a concept set $\Phi$ (concept$_1$, concept$_2$, ... concept$_n$) and a FAQ with ID of x as follows:

$$\sum_{i=1}^{n} Weight(concept_i, x).$$

Hence, given a concept set, the FAQ matcher can obtain the top n best-matched FAQs. For example, the concept set of the question "从北京到上海应该怎么走." ("How to go from Beijing to Shanghai") are "Travel" and "Route", where the match result is a FAQ set{101(weight 165), 105(weight 90)}.

The semantic class returned from the parser is used to search the concept-FAQ table. In our example, the semantic class "Route" is used as a key to search the Concept-FAQ table 702. The search determines that the third entry 710 in the table yields a perfect match. Corresponding to the "route" entry 710 is the FAQ with ID "101", which can be used to index the FAQ table 704.

At block 604 in the mapping process of FIG. 6, the FAQ matcher maps the FAQs from the FAQ space to a template space. A template represents a class of standard questions and corresponds to a semantic class in the robust parser. Every template has one or more parameters with values. Once all the parameters in a template are assigned a value, a standard question is derived from this template.

For example, "有哪些航班(Which flights are there)" is a template representing a class of questions about the flight from or to a certain location. Here, the wild card "*" denotes that there is a parameter in the template that can be assigned an arbitrary place name. If "上海(Shanghai)" is chosen, this template is transformed into a standard question "上海有那些航班(Which Shanghai flights are there)".

The FAQ table 704 associates frequently asked questions with templates. The FAQ table 704 may also include a weight to indicate how likely a FAQ pertains to a template. In our example, the frequently asked question with an ID of "101" has three entries in the FAQ table 704, identifying three corresponding templates with IDs 18, 21 and 24. Template 24 carries a weight of "100", indicating that this template is perhaps a better fit for the given FAQ than the other templates. The template IDs can then be used to index into the template table 706.

The template table 706 correlates template IDs with template descriptions and identities of corresponding answer sets. In FIG. 7, for example, the template with ID 18 corresponds to an answer table that is named "Flight Table."

It is infeasible to construct a template for every question because there are many similar questions. Instead a single template is prepared for all similar questions. This effectively compresses the FAQ set. In our example, the mapping result for FAQ set {101, 105} is a template set {24(*有那些航班, weight 165+100), 18(*的航班有哪些, weight 165+80), 21(*轮船班次情况, weight 165+50), 31(*有什么著名有那些航班, weight 90+75)}, where the weights are obtained by a simple addition of the weights from previous steps.

At block 606 in the mapping process of FIG. 6, the FAQ matcher maps templates from the template space to an answer space. All answers for a template are previously stored in a separate answer table, such as answer table 708. The answer table is indexed by parameter values of the template. When matching is done, the best parameter is calculated and passed to the search engine UI 200 to be shown to the user.

As shown in answer table 708, every answer has two parts: a URL and its description. In our example, if the user chooses a template 18 (的航班有哪些), and value of the parameter is assigned to "上海", the flight table is returned with the portion of "上海" in the table shown to the user.

Training Robust Parser Using Query Log Files

The search engine architecture 140 uses information mined by the log analyzer 148 to adapt the robust parser 142 so that it evaluates the output based on the coverage of a rule against the input query. A parsed result will be selected if it covers the most words in the query and the most parts of rules. To improve the scoring strategy, probabilities learned from query logs include:

confidence values associated with each rule;
confidence values associated with each item in a rule;
confidence values associated with each word in an input sentence.

First, consider the confidence values associated with each rule. To evaluate the parsing result more accurately, each rule is assigned a probability. Since the rules are local to a semantic class, the sum of probabilities of all the rules in a semantic class is one. Considering a semantic class having n rules, the probabilities of the $i^{th}$ rule is $w_{r_i}$, then $$\sum_i w_{ri} = 1$$

The productions in grammar are either global or local to a semantic class. The probabilities for all global productions (the productions always available) that expand the same item sum to one. The probabilities for all productions local to one semantic class (the productions only available within a semantic class) that expand the same item sum to one too.

After learning the probabilities for each rule, the next task is to learn the confidence values associated with each item in a rule. Considering a rule having N items, robust matching is performed on the rule. Suppose the items $T_{i_1}, T_{i_2} \text{ K } T_{i_n}$ are matched, but the items $T_{j_1}, T_{j_2} \text{ K } T_{j_n}$ ($1 \leq i_1, j_k \leq N$) are not matched. A confidence value indicating how well this rule is matched is then measured. The measurement may be performed, for example, by using neural networks.

One suitable implementation is to use a perceptron to measure the confidence. A perceptron has N input units, each of them representing an item in the rule, and one output unit, which represents the confidence of the rule matching. To represent the confidence continually, which is not Boolean, a Sigmoid function is used as the activation function for the output unit. For the matched item $T_{i_1}$, the corresponding input is $I_{i_1} = C_{i_1}$, in which $C_{i_1}$ is the confidence of $I_{i_1}$; whereas for the non-matched item $T_{j_k}$, the input is $I_{j_k} = 0$.

The output unit is:

$$c_r = sigmoid\left(\sum_p w_{tp} I_p\right)$$

where $w_{tp}$ is the weight from input unit $I_p$ to output unit. A standard gradient descent method is used to train the perceptron, such as that described in S. Russell, P. Norvig, "Artificial Intelligence", Prentice-Hall, Inc. 1995, pp573–577. The training data is the user query log file where the sentences are classified as positive and negative examples.

Finally, after learning the confidence values associated with each item in a rule, the last task is to learn the confidence values associated with each word in an input sentence. A non-matching word is the word in the input sentence that does not match any item in the rule. For a word W, if there are n non-matching occurrence in the training corpus, and if m(m≦n) of them result in correct rule-matching, then the confidence of this non-matching is: p=m/n. The confidence of the robust sentence matching is:

$$c_s = \prod_i p_i$$

The confidence of a rule r is calculated as below:

$$P = w_r \cdot c_r \cdot c_s$$

Search Engine User Interface

The search engine UI 200 is designed to improve efficiency and accuracy in information retrieval based on a user's search intention. The intention-centric UI design guides users to a small number of high-quality results, often consisting of fewer than ten intention-related answers. The "intention" of a search on the Internet is a process rather than an event. The search engine UI 200 attempts to capture the process as three main tasks. First, users are permitted to pose queries as natural language questions. Second, the UI presents parameterized search results from the search engine and asks users to confirm their intention. Finally, users are permitted to select their desired answer.

Figure 8:
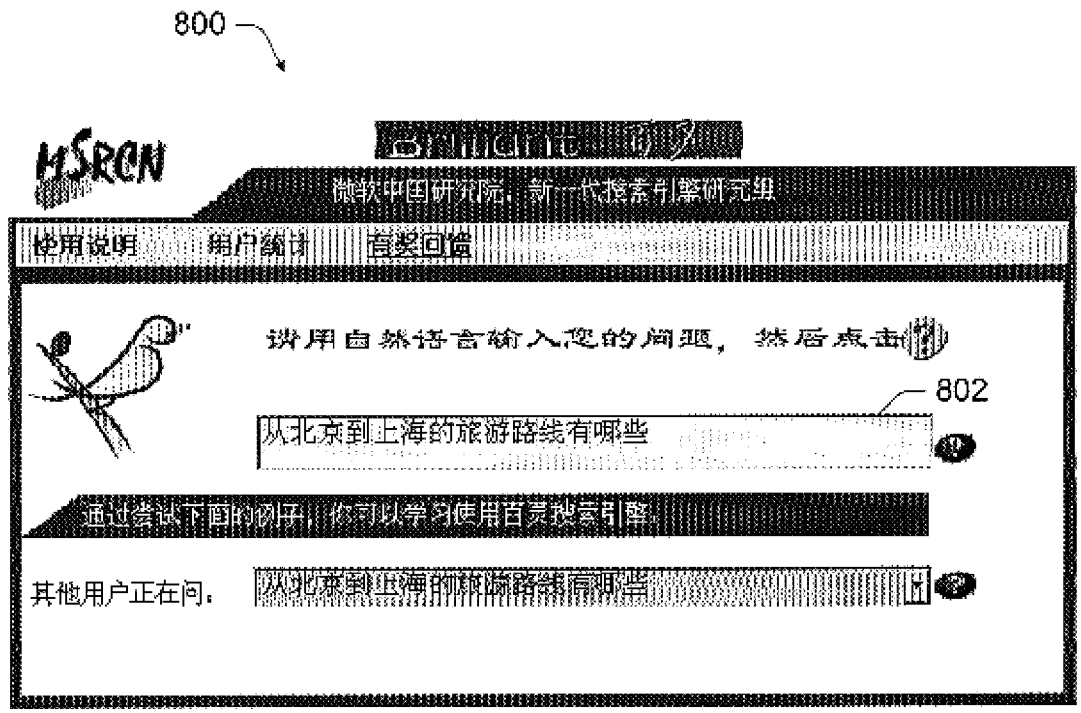
FIG. 8 illustrates a first screen view of Chinese-version search engine user interface implemented by the search engine.

FIG. 8 shows an example screen display 800 of the search engine UI 200. The screen display has a query entry area 802 that allows user to enter natural language questions. Consider, for example, the following two queries in the traveling domain search: 丛北京 到 上海的旅游路线 有哪些? (How many traveling routes exist from (Beijing) to (Shanghai)?) 北京有哪些 有哪些著名的景点? (Please tell me about the famous sights in (Beijing)?)

Natural language is a powerful tool for expressing the user intention. The most important parts of a query are referred to as core phrases. In these examples, the underlined words are core phrases, the parenthesized words are keywords, and the remaining words are redundant words.

In some cases, it is difficult or impossible to identify users' intention from the original query alone. In this case, the search engine selects all possibly relevant concept templates and asks the user to confirm. Related concepts are clustered according to their similarity and the different parts of the result are treated as parameters. From the above query, two similar search results 北京的著名景点("famous sites in Beijing") and "; 上海著名景点" ("famous sites in Shanghai") are combined into one group, where 北京(Beijing) and 上海(Shanghai) are treated as parameters.

Figure 9:
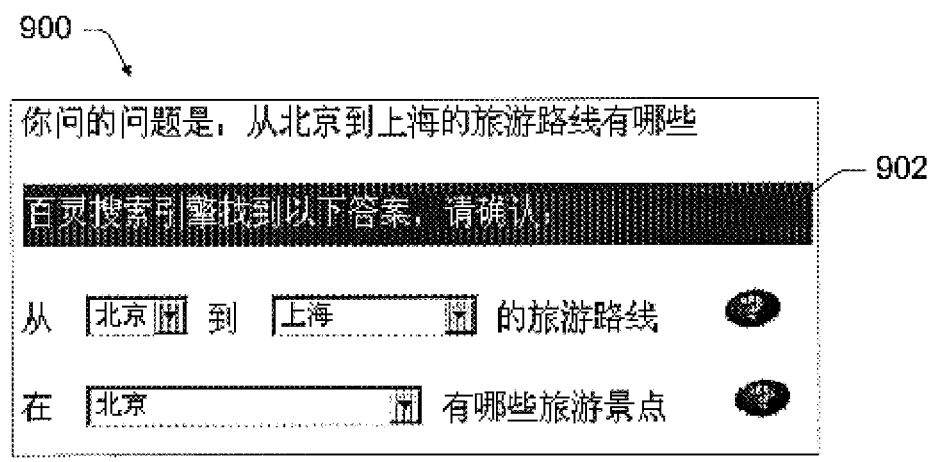
FIG. 9 illustrates a second screen view of Chinese-version search engine user interface implemented by the search engine.

FIG. 9 shows an exemplary display screen 900 that is returned with various parameterized search results. The result "(北京|上海 著名景点" (famous sites in [Beijing|Shanghai]) is depicted in result area 902. The parameterized result can help focus users' attention on the core phrases, which in this case corresponds to "著名景点" (famous sites).

In addition to intention centricity, the search engine UI is designed to seamlessly integrate searching and browsing. The search engine UI is constructed with a strong sense of structure and navigation support so that users know where they are, where they have been, and where they can go. In particular, there are two kinds of combination modes for search and browsing: (1) browsing followed by searching, and (2) searching followed by browsing.

For discussion purposes, suppose a user wants to know how to travel to Shanghai for fun. At first, the user does not know what kind of information the web can provide. The user can open a travel information-related web site and find that there is information about "travel routes" (旅游路线). At this point, the user may pose a query about the specific route to go to Shanghai from Beijing by asking, for example, "从北京到上海的旅游路线有哪些?" ("How to get from Beijing to Shanghai?")

Alternatively, the user may wish to search first, rather than browse to a travel web site. After the user inputs a natural language query, the search engine judges the user intention by using the core phrases. Because the intention extends beyond a simple question, the search engine predicts the user's intention from the current query and provides reasonable answers for confirmation. For example, in the above example, the real goal of the user is to get useful information about traveling to Shanghai. Thus, the sightseeing information about Shanghai is related to the user's intention. In response to the above query, the search results are two alternative answers related to the user's intention:

从北京到上海的旅游路线; . (The sightseeing routes from Beijing to Shanghai)

上海的旅游景点. (The sightseeing sites in Shanghai)

Conclusion

A new-generation search engine for Internet searching permits natural language understanding, FAQ template database matching and user interface components. The architecture is configured to precisely index frequently asked concepts and intentions from user queries, based on parsed results and/or keywords.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

We claim:

1. A method comprising:
   parsing a search query to produce parsed concepts and keywords;
   matching the parsed concepts and keywords to frequently asked questions;
   conducting keyword searching on the keywords; and
   returning results of the matching and the keyword searching.

2. A method as recited in claim 1, wherein the parsing comprises natural language parsing.

3. A method as recited in claim 1, wherein the matching and the conducting are performed concurrently.

4. A method as recited in claim 1, further comprising identifying answers associated with the frequently asked questions that match the parsed concepts and keywords.

5. A method as recited in claim 1, further comprising presenting the results in a user interface.

6. A method as recited in claim 1, further comprising logging the search query and the results.

7. A method as recited in claim 1, further comprising:
   logging the search query in a database, the database containing many search queries; and
   ascertaining frequently asked questions based on the search queries logged in the database.

8. A method as recited in claim 1, further comprising:
   identifying answers associated with the frequently asked questions that match the parsed concepts and keywords; and
   presenting the answers to a user for confirmation as to which answers represent the user's intention in the search query.

9. A method as recited in claim 8, further comprising:
   logging the search query and the answers confirmed by the user in a log database; and
   analyzing the log database to derive weighting factors indicating how relevant the frequently asked questions are to the parsed concepts and keywords.

10. A method as recited in claim 9, further comprising:
    logging the search query and the answers confirmed by the user in a log database; and
    analyzing the log database to derive weighting factors indicating how relevant the answers are to the frequently asked questions.

11. A method as recited in claim 1, wherein the parsing is performed by a natural language parser, and further comprising:
    logging the search query in a database; and
    training the natural language parser based on search queries logged in the database.

12. A method as recited in claim 1, further comprising deriving a confidence rating indicating how probable the results pertain to the search query.

13. A method as recited in claim 12, further comprising assigning weighting factors to indicate how relevant the answers are to the questions.

14. A method as recited in claim 12, further comprising presenting the answers to a user for confirmation as to which of the answers represent the user's intentions in the query.

15. A method as recited in claim 14, further comprising:
    analyzing the query and the answers confirmed by the user; and
    modifying the answers that are returned in response to the query based on information gleaned from the analyzing.

16. A method as recited in claim 12, wherein the parsing is performed by a natural language parser and further comprising evaluating the query, the fully-parsed output and the partially-parsed fragment to train the natural language parser.

17. A method comprising:
    receiving a query;
    parsing the query to produce at least one parsed concept;
    matching the parsed concept to one or more questions;
    identifying possible answers as being associated with the one or more questions;
    receiving user confirmation of at least one of the possible answers; and
    logging the query, the possible answers, and the user confirmation.

18. A method as recited in claim 16, further comprising assigning a weighting factor indicative of how likely each answer corresponds to the one or more questions.

19. A method as recited in claim 16, further comprising deriving a confidence rating indicating how probable the possible answers pertain to the query.

20. A method as recited in claim 17, further comprising:
    analyzing the query, the possible answers, and the user confirmation; and
    modifying the possible answers that are returned in response to the query based on information gleaned from the analyzing.

21. A search engine comprising:
a parser to parse a query using natural language parsing and produce at least one parsed concept;
a question matcher to match said at least one parsed concept or to at least one possible answer; and
a keyword searcher to search for other possible answers based on a keyword.

22. A search engine as recited in claim 21, wherein the parser produces one or more keywords and at least one of (1) a fully-parsed output, and (2) a partially-parsed fragment.

23. A search engine as recited in claim 21, wherein the question matcher comprises:
a database;
multiple tables stored in the database to hold information pertaining to concepts, questions, and answers; and
a matching module configured to correlate, via the tables, the concepts with the questions and the questions with answers.

24. A search engine as recited in claim 23, wherein the tables further hold weighting factors that indicate how relevant the questions are to the concepts, and how relevant the answers are to the questions.

25. A search engine as recited in claim 21, further comprising a user interface to present the possible answers returned from the question matcher and the keyword searcher.

26. A search engine as recited in claim 21, further comprising:
a user interface to present the possible answers returned from the question matcher and the keyword searcher to a user for confirmation regarding which of the answers represent the user's intentions in the query;
a query analyzer to evaluate the query, the possible answers, and the answers confirmed by the user.

27. A search engine as recited in claim 21, further comprising a query log to log the query and the possible answers.

28. A search engine as recited in claim 21, further comprising:
a query log to log the query and the possible answers; and
the parser being trained from data in the query log.

29. A search engine comprising:
a user interface to facilitate entry of a natural language query string;
a natural language parser to parse the query string and output at least one of a fully-parsed output, partially-parsed fragment, and one or more individual keywords,
wherein the natural language parser includes:
a segmentation module to segment the query string into individual character strings; and
a natural language parser to parse certain character strings that are parsable and leave the non-parsable character strings unparsed, wherein the natural language parser outputs:
a parse tree; and
a keyword searcher to:
identify keywords in the query; and
output the keywords.

30. A search engine as recited in claim 29, further comprising a question matcher to match the fully-parsed output to a set of frequently asked questions.

31. A search engine as recited in claim 29, further comprising a question matcher to match the partially-parsed fragment to a set of frequently asked questions.

32. A search engine as recited in claim 29, further comprising a keyword searcher to conduct a keyword search using the one or more keywords.

33. A computer-readable medium having computer-executable instructions that, when executed, direct a computer to:
parse a search query using natural language parsing to produce parsed concepts and fragments;
match the parsed concepts and fragments to frequently asked questions;
identify answers associated with the frequently ask questions; and
return results of the matching to a user for confirmation as to which of the answers represent the user's intentions in the query.

34. A computer-readable medium as recited in claim 33, further comprising computer-executable instructions that, when executed, direct a computer to:
identify keywords from the search query;
conduct keyword searching on the keywords; and
return results of the keyword matching.

* * * * *